United States Patent
Cheng et al.

(10) Patent No.: US 10,990,156 B2
(45) Date of Patent: Apr. 27, 2021

(54) METHOD FOR CALCULATING POWER-ON HOURS OF AN ELECTRONIC DEVICE AND ELECTRONIC DEVICE UTILIZING THE SAME

(71) Applicant: Wistron Corp., New Taipei (TW)

(72) Inventors: Jia-Jheng Cheng, New Taipei (TW); Hung-Hui Shih, New Taipei (TW)

(73) Assignee: Wistron Corp., New Taipei (TW)

( * ) Notice: Subject to any disclaimer, the term of this patent is extended or adjusted under 35 U.S.C. 154(b) by 402 days.

(21) Appl. No.: 15/806,274

(22) Filed: Nov. 7, 2017

(65) Prior Publication Data

US 2019/0033943 A1 Jan. 31, 2019

(30) Foreign Application Priority Data

Jul. 25, 2017 (TW) ................. 106124881

(51) Int. Cl.
| | | |
|---|---|---|
| G06F 1/3234 | (2019.01) |
| G06F 9/4401 | (2018.01) |
| G06F 1/3215 | (2019.01) |
| G06F 11/22 | (2006.01) |
| G06F 1/3287 | (2019.01) |
| G06F 1/14 | (2006.01) |
| G06F 1/3228 | (2019.01) |
| G06F 11/07 | (2006.01) |

(52) U.S. Cl.
CPC ............. *G06F 1/325* (2013.01); *G06F 1/14* (2013.01); *G06F 1/3215* (2013.01); *G06F 1/3228* (2013.01); *G06F 1/3287* (2013.01); *G06F 9/4418* (2013.01); *G06F 11/0757* (2013.01); *G06F 11/2284* (2013.01)

(58) Field of Classification Search
None
See application file for complete search history.

(56) References Cited

U.S. PATENT DOCUMENTS

| | | | |
|---|---|---|---|
| 2004/0153724 A1* | 8/2004 | Nicholson | G06F 11/0709 714/6.11 |
| 2006/0190752 A1* | 8/2006 | Lee | G06F 1/14 713/323 |
| 2007/0078770 A1* | 4/2007 | Hsieh | G06F 21/552 705/51 |

FOREIGN PATENT DOCUMENTS

| | | |
|---|---|---|
| CN | 100419709 C | 9/2008 |
| TW | 200805033 A | 1/2008 |

* cited by examiner

*Primary Examiner* — Paul Yen

(57) ABSTRACT

An electronic device includes a processor, a timer and a memory device. The memory device stores a value for power-on hours. During the process of booting the electronic device, the processor triggers the timer to start counting down. When the timer expires, the processor updates the value of power-on hours.

15 Claims, 4 Drawing Sheets

METHOD FOR CALCULATING POWER-ON HOURS OF AN ELECTRONIC DEVICE AND ELECTRONIC DEVICE UTILIZING THE SAME

CROSS REFERENCE TO RELATED APPLICATIONS

This Application claims priority of Taiwan Patent Application No. 106124881, filed on Jul. 25, 2017, the entirety of which is incorporated by reference herein.

BACKGROUND OF THE INVENTION

Field of the Invention

The invention relates to an electronic device and method for calculating power-on hours (POH), which not only effectively reduces the cost of the hardware device and of research and development, but also can accurately calculate the power-on hours of the electronic device.

Description of the Related Art

For a certain period of time after the sale of an electronic product, if there is any damage that has not been caused by the customer, the manufacturer will generally provide the customer with free or discounted maintenance services. This period of free or discounted maintenance service is called the warranty period. The expiry date of the warranty period is usually determined by the date on which the customer actively registered the purchase of the electronic product via the Internet, or by the purchase date of the electronic product as recorded on the warranty card.

However, the determination of the warranty period can become a contentious issue if the customer loses the warranty card, or if the customer claims that the product was damaged within the warranty period, but for some reason the product is not taken in for repair until after warranty period has expired.

In order to avoid such disagreements about the warranty period, methods for automatically calculating the power-on hours (abbreviated as POH) at the product end and the corresponding device are provided. Based on the proposed device and methods, the power-on hours of the electronic product can not only be accurately recorded, which helps to accurately determine the warranty period, but they can also be used as the basis for a failure analysis when the electronic product becomes damaged, so that the warranty repair service can be provided more smoothly by manufacturers, and better maintenance services can be provided to customers.

BRIEF SUMMARY OF THE INVENTION

An electronic device and method for calculating power-on hours are provided. An exemplary embodiment of an electronic device comprises a processor, a timer and a memory device. The memory device stores a value for power-on hours. During the process of booting the electronic device, the processor triggers the timer to start counting down. When the timer expires, the processor updates the value of power-on hours.

In some embodiments, when the timer expires, the processor resets the timer and triggers the timer to start counting down again, and when the timer expires, the processor updates the value of power-on hours again.

In some embodiments, the processor sets a count value to be counted by the timer and triggers the timer to start counting down from the count value and at the end of the countdown of the timer, and then the processor updates the value of power-on hours according to the count value.

In some embodiments, the timer is a TCO timer.

In some embodiments, the memory device further stores BIOS code of the electronic device, wherein the processor triggers the timer by executing the BIOS code.

An exemplary embodiment of a method for calculating power-on hours, suitable for an electronic device, comprises: triggering a timer to start counting down during the process of booting the electronic device; and updating the value for power-on hours stored in a memory device when the timer expires.

In some embodiments, the method further comprises, when the timer expires, resetting the timer and triggering the timer to start counting down again; and when the timer expires again, updating the value of power-on hours again.

In some embodiments, the memory device further stores BIOS code of the electronic device and the method further comprises: executing the BIOS code to trigger the timer.

In some embodiments, the method further comprises issuing an interrupt signal when the timer expires.

In some embodiments, the timer is a TCO timer of the electronic device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
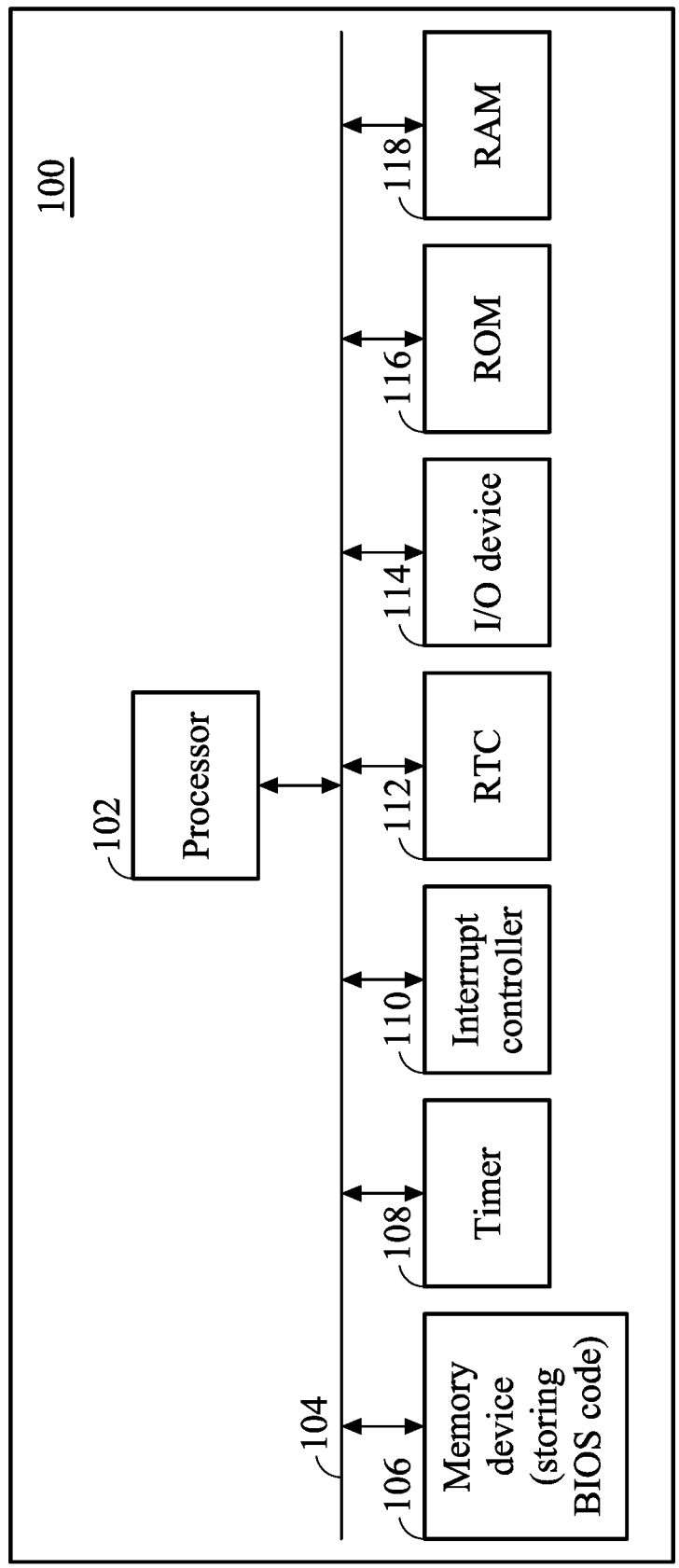
FIG. 1 is an exemplary block diagram of an electronic device according to an embodiment of the invention.

FIG. 1 is an exemplary block diagram of an electronic device according to an embodiment of the invention. The electronic device 100 may comprise a processor 102, a system bus 104, a memory device 106, such as a Non-Volatile memory (NVRAM), a timer 108, an interrupt controller 110 and a real-time clock (RTC) 112. The system bus 104 may be further coupled to the input/output (I/O) device 114 (such as the keyboard, the mouse, etc.), the read only memory (ROM) 116, the random access memory (RAM) 118.

According to an embodiment of the invention, the electronic device 100 may be a personal computer, a laptop computer, a tablet computer, or the likes. The memory device 106 may be a chip that stores the BIOS (Basic Input/Output System) code of the electronic device 100.

Note that FIG. 1 presents a simplified block diagram, in which only the elements relevant to the invention are shown. However, the invention should not be limited the structures and components shown in FIG. 1.

When the user presses the power key of the electronic device 100, the electronic device 100 is provided with power and is started-up, and the process of booting the electronic device 100 begins. During the process of booting the electronic device 100, the processor 102 executes the BIOS code to initiate a serious of operations, comprising executing the power-on self-test (POST) to check whether each fundamental hardware component functions normally, and then performing subsequent procedures. The BIOS code is configured to manage the system date, power mode, and configurations of the hardware devices, peripheral devices, and memory devices.

According to an embodiment of the invention, besides the BIOS code of the electronic device 100, the memory device 106 also stores the value for power-on hours POH_Value. In the embodiments of the invention, the timer 108 is repeatedly triggered by executing the BIOS code to keep counting down, and the power-on hours POH of the electronic device 100 is calculated based on the counting result of the timer 108. In this manner accurate power-on hours POH can be obtained. The proposed electronic device and methods for calculating power-on hours are further discussed in the following paragraphs.

According to an embodiment of the invention, the timer 108 may be a timer logic circuit, such as a TCO (Total Cost of Ownership) timer.

According to an embodiment of the invention, during the process of booting the electronic device 100, the processor 102 triggers the timer 108 to start counting down, and when the timer 108 expires, the processor 102 updates the value of power-on hours POH_Value. To be more specific, the processor 102 may set a count value T_Count to be counted by the timer as a predetermined time period, as an example, 10 minutes, and trigger the timer 108 to start counting down from the count value T_Count. The processor 102 may perform other tasks as the timer 108 is counting down. As an example, the processor 102 may keep executing the BIOS code to complete the boot process, or, after the boot process is completed and the operating system (OS) is entered, the processor 102 may keep executing other system program codes.

At the end of the countdown of the timer 108 (that is, when the timer 108 expires, or the timer 108 has finished counting the count value T_Count), the timer 108 may issue an interrupt signal to notify the processor 102 of the timer expiration. For example, the interrupt controller 110 may notify the processor 102 of the timer expiration after receiving the interrupt signal. Upon receiving the interrupt signal, the processor 102 may execute a predetermined section of the program code in the BIOS code, so as to update the value of power-on hours POH_Value according to the count value T_Count. For example, every time the processor 102 receives the interrupt signal issued by the timer 108, the processor 102 accumulates the value of power-on hours POH_Value according to the count value T_Count (that is, adding the T_Count to the value of power-on hours POH_Value), to obtain the latest value of power-on hours POH_Value. In addition, the processor 102 may reset the timer 108 and trigger the timer 108 to start counting down again. Similarly, the processor 102 may perform other tasks as the timer 108 is counting down. At the end of the countdown of the timer 108 (that is when the timer 108 expires), the timer 108 may issue an interrupt signal again, to notify the processor 102 of the expiration. Upon receiving the interrupt signal, the processor 102 may perform the similar operations as discussed above again.

According to an embodiment, the timer 108 may be repeatedly set, reset and triggered, so as to keep calculating the power-on hours POH of the electronic device 100. In this manner, accurate power-on hours POH can be obtained.

In the conventional designs, the calculation of the power-on hours POH is usually carried out by an extra microprocessor. The microprocessor may calculate the power-on time based on its internal clock to obtain the power-on hours POH. However, using the extra microprocessor not only increases the hardware cost of the electronic device, but also increases the research and development cost of the electronic device since cooperation of the corresponding firmware driver is also required.

Unlike the conventional design, in the embodiments of the invention, the built-in timer inside of the electronic device 100, such as the TCO timer in the X86 structures, is used. With the programming of the BIOS code, the power-on hours of the electronic device 100 can be continuously calculated after the electronic device 100 is provided with power and is started-up, and the value of the power-on hours POH_Value is continuously and periodically updated. Therefore, in the embodiment of the invention, the steps of setting the timer 108, resetting the timer 108, triggering the timer 108, and updating the value of the power-on hours POH_Value can be performed by executing the BIOS code.

In this manner, there is no need to use an extra microprocessor, and accurate power-on hours can be obtained. Not only the hardware cost and the research and development cost of the electronic device can be reduced, but also accurate power-on hours can be obtained. The obtained power-on hours is helpful to accurately determine the warranty period, and can also be provided as the basis for failure analysis when the electronic product is damaged.

Figure 2:
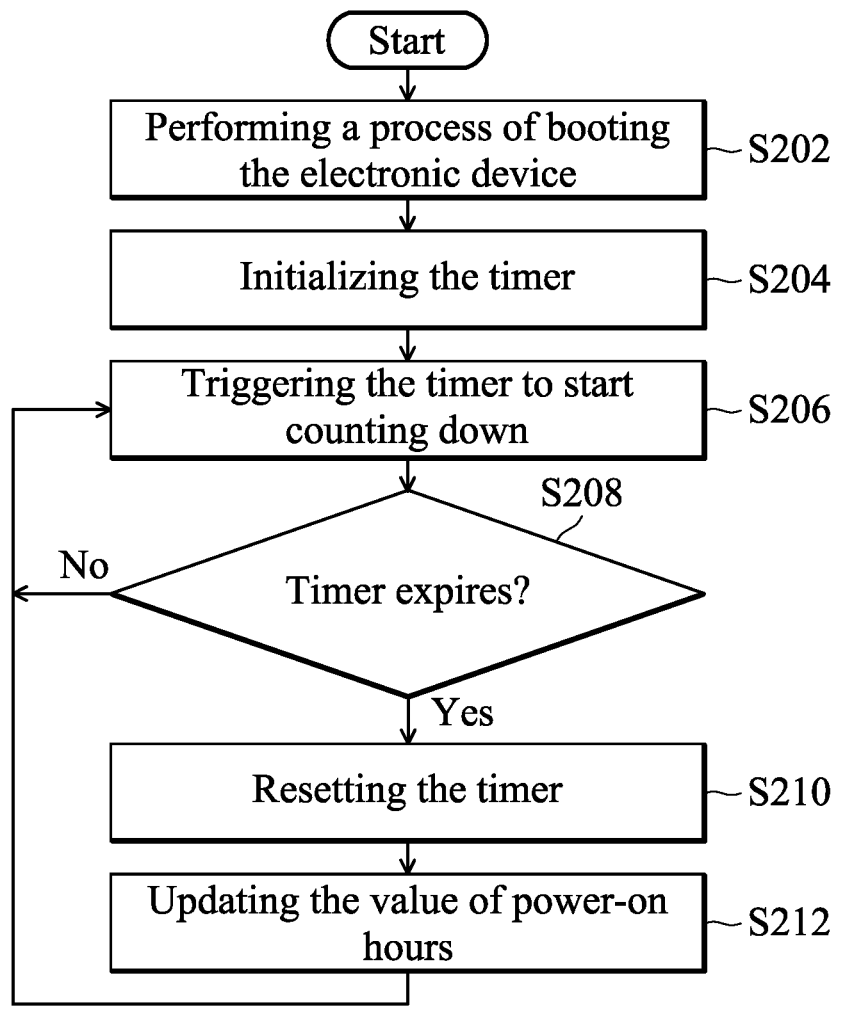
FIG. 2 is a flow chart of a method for calculating power-on hours according to an embodiment of the invention.

FIG. 2 is a flow chart of a method for calculating power-on hours according to an embodiment of the invention. First of all, the process of booting the electronic device is performed (Step S202). As discussed, when the electronic device 100 is provided with power and is started-up, and the processor 102 executes the BIOS code to start the process of booting the electronic device 100. Next, the processor 102 may initialize the timer 108 according to the BIOS code (Step S204) and trigger the timer 108 to start counting down (Step S206). The operations of initializing the timer 108 may comprise setting a count value T_Count to be counted by the timer 108 as a predetermined time period.

The timer 108 may keep counting down according to the system clock of the electronic device 108 until the timer 108 expires. When the timer 108 expires (the "yes" path from the step S208), an interrupt signal is issued such that the processor 102 may reset the timer 180 based on the BIOS code (Step S210) in response to the interrupt signal, so as to trigger the timer 108 to count down again, and update the value of power-on hours POH_Value (Step S212). After updating the value of power-on hours POH_Value, the process returns to step S206 and the timer 108 keeps counting down. In the embodiment of the invention, the timer 108 may repeatedly be reset, so as to keep counting and updating the power-on hours of the electronic device 100.

Figure 3:
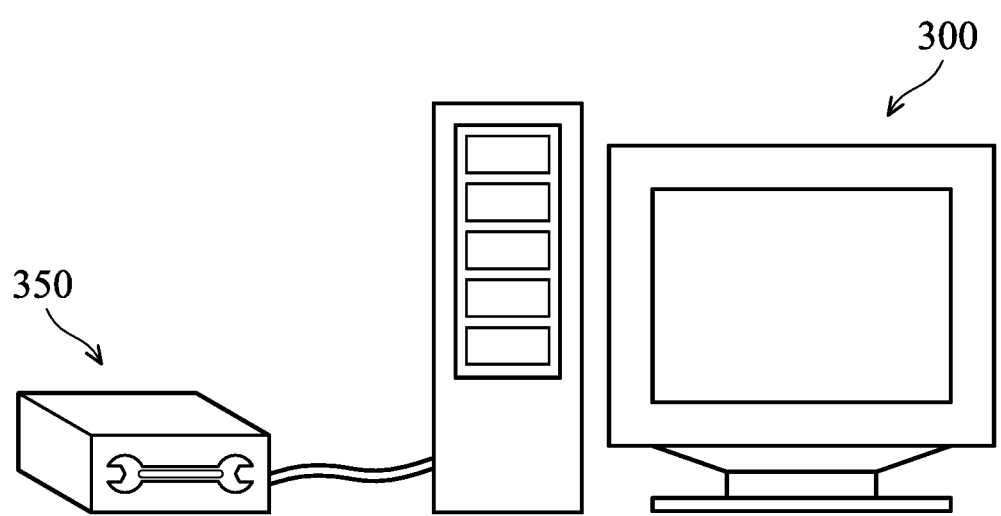
FIG. 3 is a schematic diagram of a device reading the value of power-on hours POH_Value according to an embodiment of the invention.

FIG. 3 is a schematic diagram of a device reading the value of power-on hours POH_Value according to an embodiment of the invention. In this embodiment, the electronic device 300 is a personal computer. However, it should be noted that the invention should not be limited thereto. During the maintenance or inspection of the electronic device 300, the value of power-on hours POH_Value recorded by the electronic device 300 can be read out by connecting an external device 350 to the electronic device 300. The power-on hours POH_Value may assist in determining the warranty period or be provided as the basis for failure analysis when the electronic product is damaged.

According to another embodiment of the invention, when the electronic device enters the sleep state S3 or the hibernate state S4, the power-on hours POH_Value may keep being accumulated, so as to obtain a more accurate power-on hours. Based on the specification of Advanced Configuration and Power Interface (ACPI), the sleep state G1 can be subdivided into four states from S1 to S4 with different depths of sleep. Among them, the sleep state S3 is also called as "suspend to RAM". In this state, besides the main memory (RAM) which still has a small amount of power supply, the hardware power of the remaining devices within the computer system are all turned off. The hibernate state S4 is also called as "suspend to disk". In this state, the whole computer system is turned off after the data of the internal system memory is written in the hard disk. Therefore, the power consumption in the hibernate state S4 is the same as the power consumption when the computer is shut down. In other words, when the electronic device enters the sleep state (S3) or the hibernate state (S4), the hardware power of most of the devices within the computer system is turned off. Therefore, the designer may flexibly design whether to count the period of time during which the electronic device enters the sleep state (S3) or the hibernate state (S4) in the power-on hours POH_Value of the electronic device 100/300. Generally, more accurate power-on hours can be obtained when the period of time during which the electronic device enters the sleep state (S3) or the hibernate state (S4) is counted in the power-on hours POH_Value of the electronic device 100/300.

Therefore, in another embodiment of the invention, when the electronic device is about to enter the sleep state (S3) or the hibernate state (S4) and before the sleep state (S3) or the hibernate state (S4) is entered, the processor 102 executes the corresponding BIOS code and reads the current time stamp (for example, the time stamp TimeStamp_1) of the RTC 112 according to the BIOS code, and records the time stamp in the memory device (for example, the memory device 106 or the RAM 118). In addition, when the electronic device is woken up to leave the sleep state (S3) or the hibernate state (S4), the processor 102 executes the corresponding BIOS code and reads the current time stamp (for example, the time stamp Time Stamp_2) of the RTC 112 according to the BIOS code, and records the time stamp in the memory device (for example, the memory device 106 or the RAM 118).

Next, the processor 102 may further calculate the time span between the two time stamps TimeStamp_1 and TimeStamp_2, and update the value of power-on hours POH_Value according to the calculated time span. For example, adding the calculated time span to the recorded value of power-on hours POH_Value to obtain the latest value of power-on hours POH_Value.

Since the electronic device executes the corresponding BIOS code to perform some necessary task when the electronic device enters the sleep state (S3) and the hibernate state (S4) and leaves the sleep state (S3) and the hibernate state (S4), by programming the BIOS code, the current time stamp of the RTC 112 will be read out and recorded when the electronic device enters the sleep state (S3) and the hibernate state (S4) and leaves the sleep state (S3) and the hibernate state (S4). Therefore, the accurate time span between entering and leaving the sleep/hibernate state can be obtained and updated in the value of power-on hours POH_Value.

Figure 4:
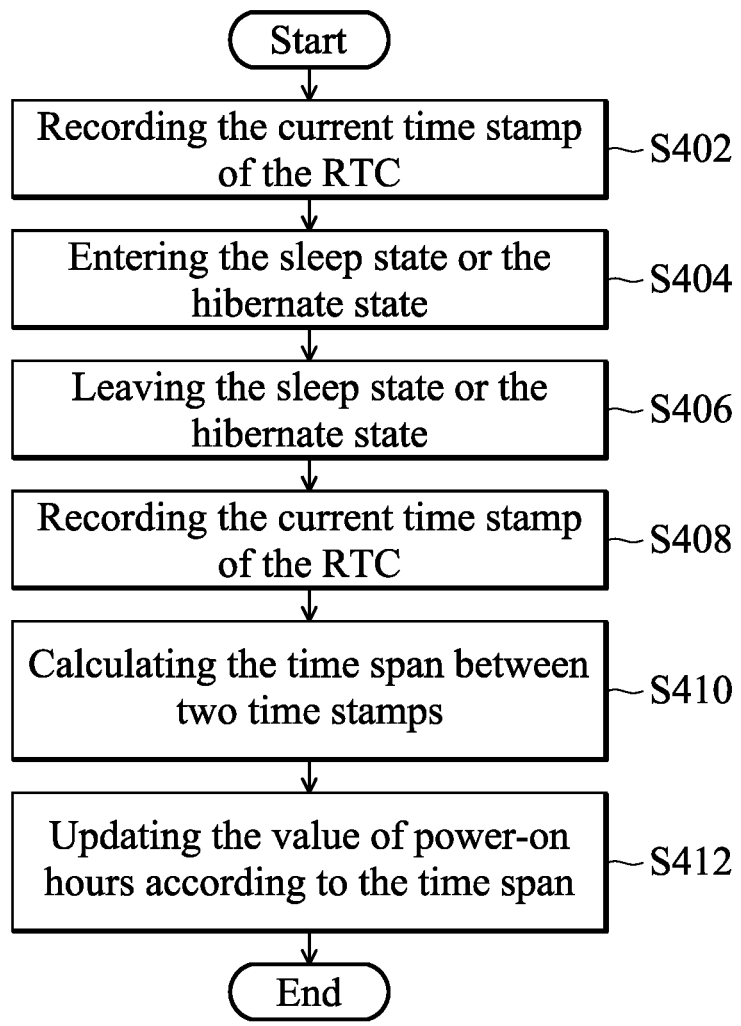
FIG. 4 is a flow chart showing the method for calculating the power-on hours according to another embodiment of the invention.

FIG. 4 is a flow chart showing the method for calculating the power-on hours according to another embodiment of the invention. First of all, when the electronic device is triggered and is about to enter the sleep state (S3) or the hibernate state (S4) and before the sleep state (S3) or the hibernate state (S4) is entered, the processor 102 records the current time stamp of the RTC 112 (Step S402). Next, the electronic device enters the sleep state (S3) or the hibernate state (S4) (Step S404). Next, when the electronic device leaves the sleep state (S3) or the hibernate state (S4) (Step S406), the processor 102 records the current time stamp of the RTC 112 (Step S408), calculates the time span between two time stamps (Step S410) and updates the value of power-on hours according to the time span (Step S412). Next, the process may return to step S206 and the timer 108 may keep counting down.

In the embodiment of the invention, when the electronic device 100/300 is functioning, the power-on hours are calculated by using the timer 108, and when the electronic device 100/300 enters the sleep state or the hibernation state, the power-on hours is calculated by using the RTC 112. In this manner, accurate power-on hours can be obtained without using the extra microprocessor, and the hardware cost and the research and development cost of the electronic device can be reduced. In addition, since there is no need to use the RTC 112 to calculate the power-on hours when the electronic device 100/300 is functioning, the problems derived from overreliance on the RTC 112 can be avoided.

Generally, the RTC has a back-up power supply that allows the RTC to continue counting when the host power is de-energized or unusable. However, when the back-up power supply of the RTC fails, or when the user resets the system time, the timestamp of the RTC is changed accordingly. In this way, erroneous power-on hours will be obtained when the RTC 112 is adopted to calculate the power-on hours when the electronic device 100/300 is functioning.

In other words, based on the proposed electronic device and methods for calculating the power-on hour, accurate power-on hours can be obtained without using the extra microprocessor. Therefore, not only can the hardware cost and the research and development cost of the electronic device be reduced, but also the problems derived from using the RTC 112 to calculate the power-on hours can be avoided. In this manner, the power-on hours can be calculated more accurately as discussed above, and the defects of the conventional designs can be overcome.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:
1. An electronic device, comprising:
a processor;
a real-time clock (RTC);
a timer; and a memory device, storing a value for power-on hours,
wherein during a process of booting the electronic device, the processor triggers the timer to start a counting down operation, and responsive to the timer having finished the counting down operation, the processor updates the value of power-on hours, wherein:

responsive to the timer having finished the counting down operation, the processor resets the timer and triggers the timer to start the counting down operation again, and responsive to the timer having finished the counting down operation, the processor updates the value of power-on hours again, and wherein:

the processor is configured to execute BIOS code of the electronic device during the process of booting the electronic device, responsive to the electronic device entering a sleep state or a hibernation state, the power-on hours are calculated by using the RTC, responsive to the electronic device leaving the sleep state or the hibernation state, the power-on hours are calculated by using the timer.

2. The electronic device as claimed in claim 1, wherein the processor sets a count value to be counted by the timer, triggers the timer to start the counting down operation from the count value and at the end of the countdown of the timer, the processor updates the value of power-on hours according to the count value.

3. The electronic device as claimed in claim 1, wherein the timer is a TCO timer.

4. The electronic device as claimed in claim 1, wherein the memory device further stores the BIOS code of the electronic device, wherein the processor triggers the timer by executing the BIOS code.

5. The electronic device as claimed in claim 1, wherein:

responsive to the electronic device entering the sleep state or the hibernation state, the processor records a first time stamp of the RTC in the memory device, responsive to the electronic device leaving the sleep state or the hibernation state, the processor records a second time stamp of the RTC in the memory device, and the processor reads the memory device to calculate a time span between the first time stamp and the second time stamp and updates the value of power-on hours according to the time span.

6. The electronic device as claimed in claim 1, wherein the processor is a general processor.

7. The electronic device as claimed in claim 2, wherein at the end of the countdown of the timer, the processor adds the count value to the value of power-on hours to update the value of power-on hours.

8. The electronic device as claimed in claim 7, wherein responsive to the timer having finished the counting down operation, the timer issues an interrupt signal to an interrupt controller which notifies the processor such that the processor executes a predetermined section of the program code in the BIOS code to update the value of power-on hours.

9. The electronic device as claimed in claim 8, further comprising:

a system bus coupled to the timer, the interrupt controller, and the processor.

10. A method for calculating power-on hours, suitable for an electronic device, comprising:

executing, by a processor, BIOS code of the electronic device during the process of booting the electronic device;

triggering a timer, by the processor, to start a counting down operation during the process of booting the electronic device;

updating a value, by the processor, for power-on hours stored in a memory device responsive to the timer having finished the counting down operation;

responsive to the timer having finished the counting down operation, resetting the timer and triggering the timer to start the counting down operation again;

responsive to the timer having finished the counting down operation, updating the value of power-on hours again; and responsive to the electronic device entering a sleep state or a hibernation state, the power-on hours are calculated by using an real-time clock (RTC), wherein responsive to the electronic device leaving the sleep state or the hibernation state, the power-on hours are calculated by using the timer.

11. The method as claimed in claim 10, wherein the memory device further stores the BIOS code of the electronic device and the timer is triggered by executing the BIOS code.

12. The method as claimed in claim 10, further comprising:

issuing an interrupt signal responsive to the timer having finished the counting down operation.

13. The method as claimed in claim 10, wherein the timer is a TCO timer of the electronic device.

14. The method as claimed in claim 10, wherein the processor is a general processor.

15. The method as claimed in claim 11, further comprising:

before the electronic device enters the sleep state the a hibernate state:
reading the RTC to obtain a first time stamp; and
recording the first time stamp in the memory device;

after the electronic device leaves the sleep state or the hibernate state:
reading the RTC to obtain a second time stamp;
recording the second time stamp in the memory device;
calculating a time span between the first time stamp and the second time stamp; and
adding the time span to the value of power-on hours.

* * * * *